(12) United States Patent
Homison

(10) Patent No.: US 11,982,227 B2
(45) Date of Patent: May 14, 2024

(54) METHODS AND SYSTEMS USING A BRAYTON CYCLE

(71) Applicant: Transportation IP Holdings, LLC, Norwalk, CT (US)

(72) Inventor: Christopher Homison, Wattsburg, PA (US)

(73) Assignee: TRANSPORTATION IP HOLDINGS, LLC, Norwalk, CT (US)

( * ) Notice: Subject to any disclaimer, the term of this patent is extended or adjusted under 35 U.S.C. 154(b) by 0 days.

(21) Appl. No.: 18/160,840

(22) Filed: Jan. 27, 2023

(65) Prior Publication Data

US 2023/0265790 A1 Aug. 24, 2023

Related U.S. Application Data

(60) Provisional application No. 63/268,231, filed on Feb. 18, 2022.

(51) Int. Cl.

| | |
|---|---|
| *F02C 6/12* | (2006.01) |
| *F01D 15/10* | (2006.01) |
| *F01D 19/00* | (2006.01) |
| *F01D 21/00* | (2006.01) |
| *F02B 37/12* | (2006.01) |
| *F02B 39/10* | (2006.01) |
| *F02C 1/10* | (2006.01) |
| *H02K 7/00* | (2006.01) |
| *H02K 7/18* | (2006.01) |
| *H02P 3/06* | (2006.01) |

(52) U.S. Cl.
CPC ............... *F02C 6/12* (2013.01); *F01D 15/10* (2013.01); *F02B 37/12* (2013.01); *F02B 39/10* (2013.01); *F02C 1/10* (2013.01); *H02K 7/003* (2013.01); *H02K 7/1823* (2013.01); *H02P 3/06* (2013.01); *F01D 19/00* (2013.01); *F01D 21/00* (2013.01); *F05D 2210/12* (2013.01); *F05D 2220/40* (2013.01); *F05D 2220/76* (2013.01); *Y02T 10/12* (2013.01)

(58) Field of Classification Search
CPC .................. F02C 1/00–105; F02C 6/12; F02B 37/00–24; F02B 39/10
See application file for complete search history.

(56) References Cited

U.S. PATENT DOCUMENTS

| | | | | |
|---|---|---|---|---|
| 3,858,390 A | * | 1/1975 | Jansen | F02C 9/22 60/39.17 |
| 4,494,372 A | * | 1/1985 | Cronin | F02C 7/32 60/785 |

(Continued)

FOREIGN PATENT DOCUMENTS

| | | | | |
|---|---|---|---|---|
| GB | 2402172 A | * | 12/2004 | F02C 1/04 |

OTHER PUBLICATIONS

Great Britain Intellectual Property Office, Search Report under Section 17(5) Issued in Application No. GB2301450.9, dated Jul. 28, 2023, 5 pages.

*Primary Examiner* — Laert Dounis
(74) *Attorney, Agent, or Firm* — McCoy Russell LLP

(57) ABSTRACT

Methods and systems are provided for a Brayton cycle system. In one example, a system for an air Brayton cycle includes a chamber that can receive a first energy source and a second energy source, a turbocharger, and a motor/generator coupled to a shaft of the turbocharger between a compressor and a turbine.

13 Claims, 5 Drawing Sheets

(56) References Cited

U.S. PATENT DOCUMENTS

| | | | |
|---|---|---|---|
| 5,323,613 A | 6/1994 | Akiyama | |
| 5,678,407 A | 10/1997 | Hara | |
| 7,296,409 B2 | 11/2007 | Spooner | |
| 10,765,994 B2 | 9/2020 | Hofer et al. | |
| 2004/0237535 A1* | 12/2004 | Ainsworth | F01D 19/02 60/39.511 |
| 2012/0000204 A1* | 1/2012 | Kesseli | F02C 3/107 60/778 |
| 2017/0350650 A1 | 12/2017 | Hofer et al. | |
| 2019/0153930 A1 | 5/2019 | Meano | |
| 2020/0191048 A1 | 6/2020 | Homison et al. | |
| 2020/0191051 A1 | 6/2020 | Homison et al. | |
| 2020/0263603 A1 | 8/2020 | Homison et al. | |

* cited by examiner

METHODS AND SYSTEMS USING A BRAYTON CYCLE

CROSS REFERENCE TO RELATED APPLICATIONS

The present application claims priority to U.S. Provisional Application No. 63/268,231, entitled "METHODS AND SYSTEMS FOR AIR BRAYTON CYCLES", and filed on Feb. 18, 2022. The entire contents of the above-listed application are hereby incorporated by reference for all purposes.

TECHNICAL FIELD

Embodiments of the subject matter disclosed herein relate to a system employing a Brayton cycle, and more specifically, to operating a system using an air Brayton cycle with an e-turbo.

DISCUSSION OF ART

An air Brayton cycle is a thermodynamic cycle that may utilize air as a working fluid to drive an engine. An air Brayton cycle may operate using a turbocharger in conjunction with a mixing chamber. The compressor of the turbocharger may output compressed air into the mixing chamber, which may then mix the compressed air in the mixing chamber along with a first energy source, such as a heat exchanger, to output a heated charge into the turbine. The turbine may then convert the energy stored in the heated charge into the mechanical motion driving the turbine, which in turn drives the shaft. In some examples, the shaft may be connected to a mechanical load, thereby transferring some of the rotational motion of the shaft into work done on the mechanical load. In other examples, the engine may not include a mechanical load coupled to the shaft, but may be gas loaded, whereby a portion of the compressed gas generated by the compressor during the air Brayton cycle is taken out of the cycle loop for use in another process. In some examples, the first energy source may be a non-controllable energy source, such as waste heat collected via a waste heat exchanger. It may be desirable to have a system and method that differs from those that are currently available.

BRIEF DESCRIPTION

In one embodiment, the current disclosure provides support for a system including a housing defining a chamber that is configured to receive a first energy source and a second energy source, a turbocharger coupled to the chamber, and a motor/generator coupled to a shaft of the turbocharger between a compressor and a turbine.

In a further embodiment, the disclosure provides support for a method including adjusting operation of a motor/generator of a turbocharger in response to a condition, wherein a shaft of the turbocharger is coupled to a turbine, the motor/generator, a compressor, and a mechanical load.

In an additional embodiment, the disclosure provides support for a system including a housing defining a chamber that is configured to receive a first energy source and a second energy source, a turbocharger coupled to the chamber, a motor/generator coupled to a shaft of the turbocharger between a compressor and a turbine, a mechanical load coupled to the shaft, and a controller with computer-readable instructions stored on memory thereof that when executed cause the controller to monitor a condition of the system, and adjust operation of the motor/generator in response to the condition.

DETAILED DESCRIPTION

Figure 1:
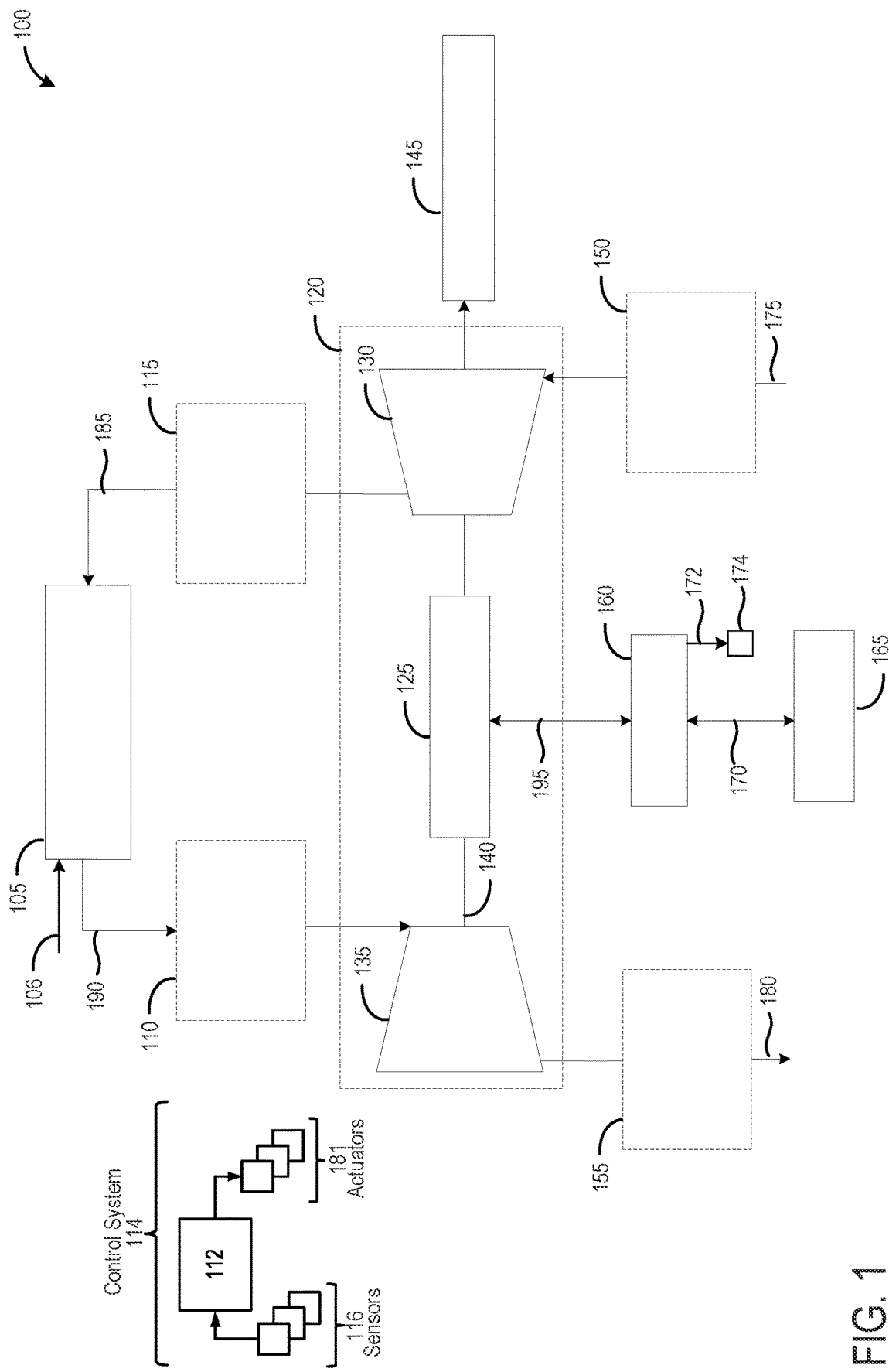
FIG. 1 shows a schematic diagram of an air Brayton cycle including a turbocharger, according to an embodiment of the present disclosure.
Figure 2:
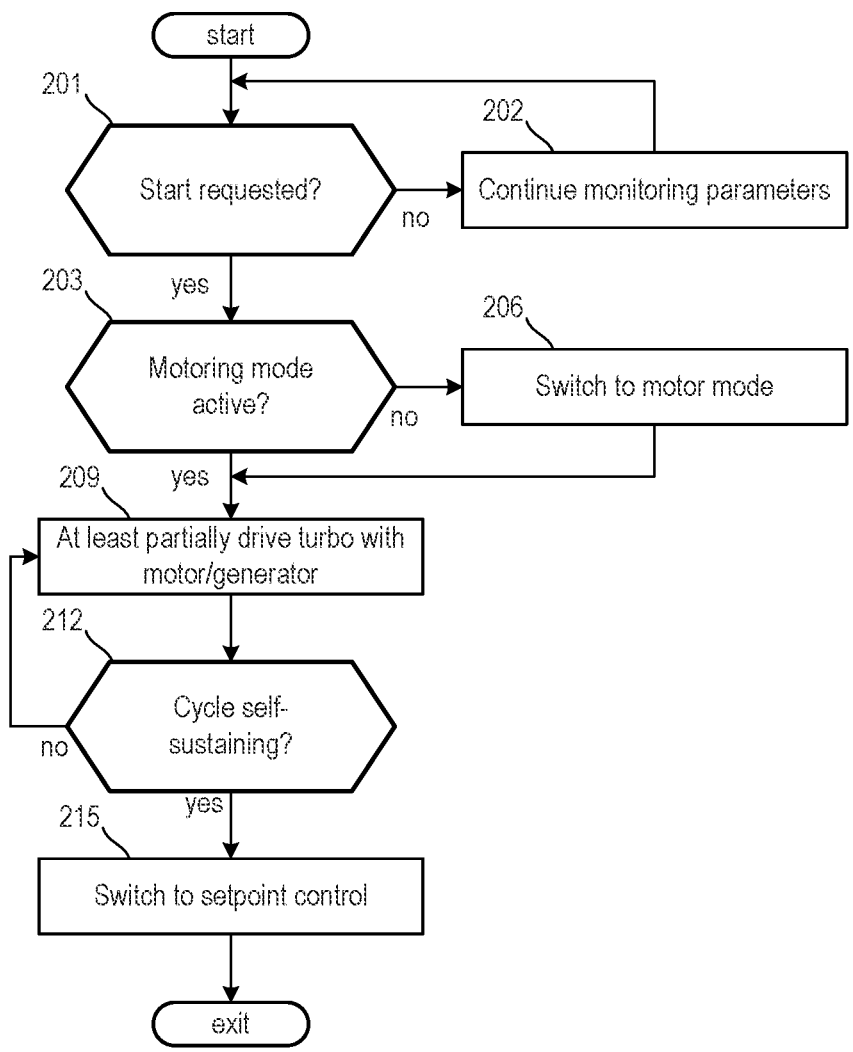
FIG. 2 shows a high-level method for controlling a startup of the air Brayton cycle via operation of the e-turbo of FIG. 1.
Figure 3:
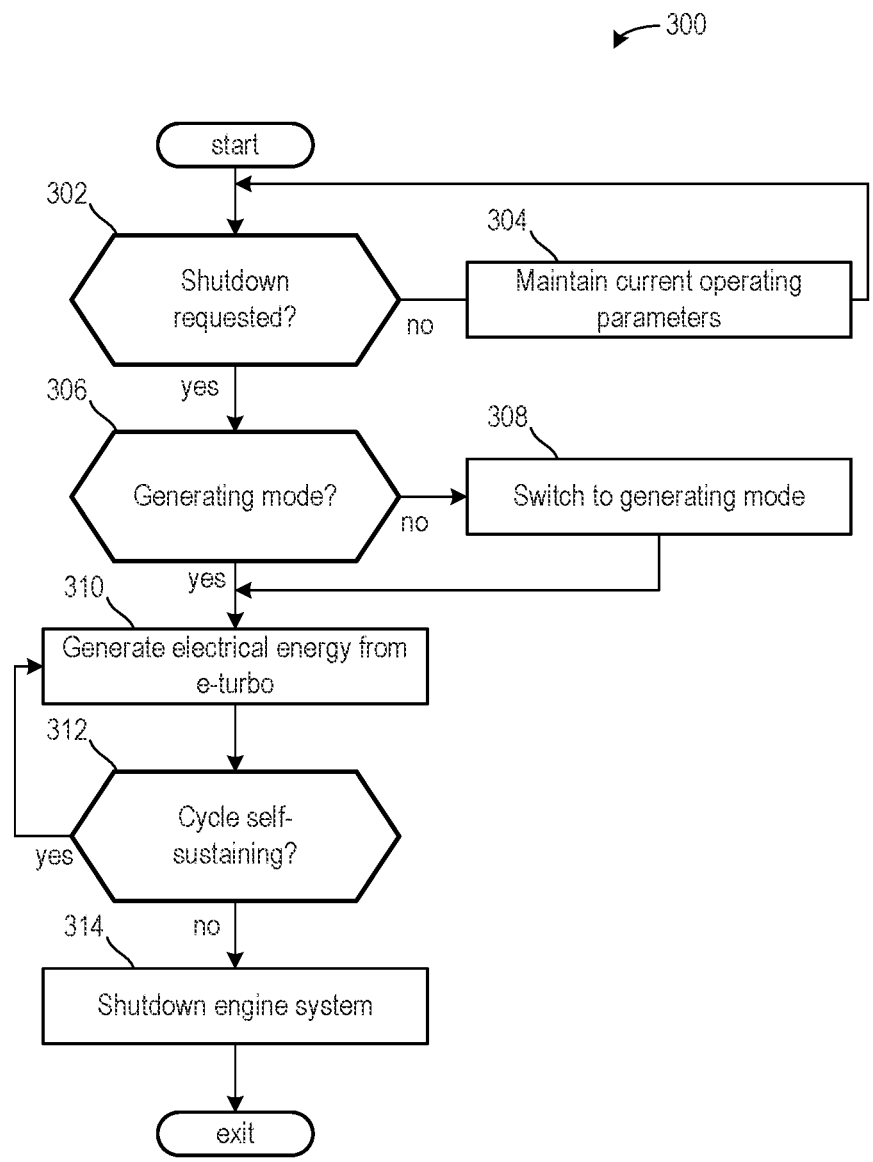
FIG. 3 shows a high-level method for controlling shutdown of the air Brayton cycle via operation of the e-turbo of FIG. 1.
Figure 4:
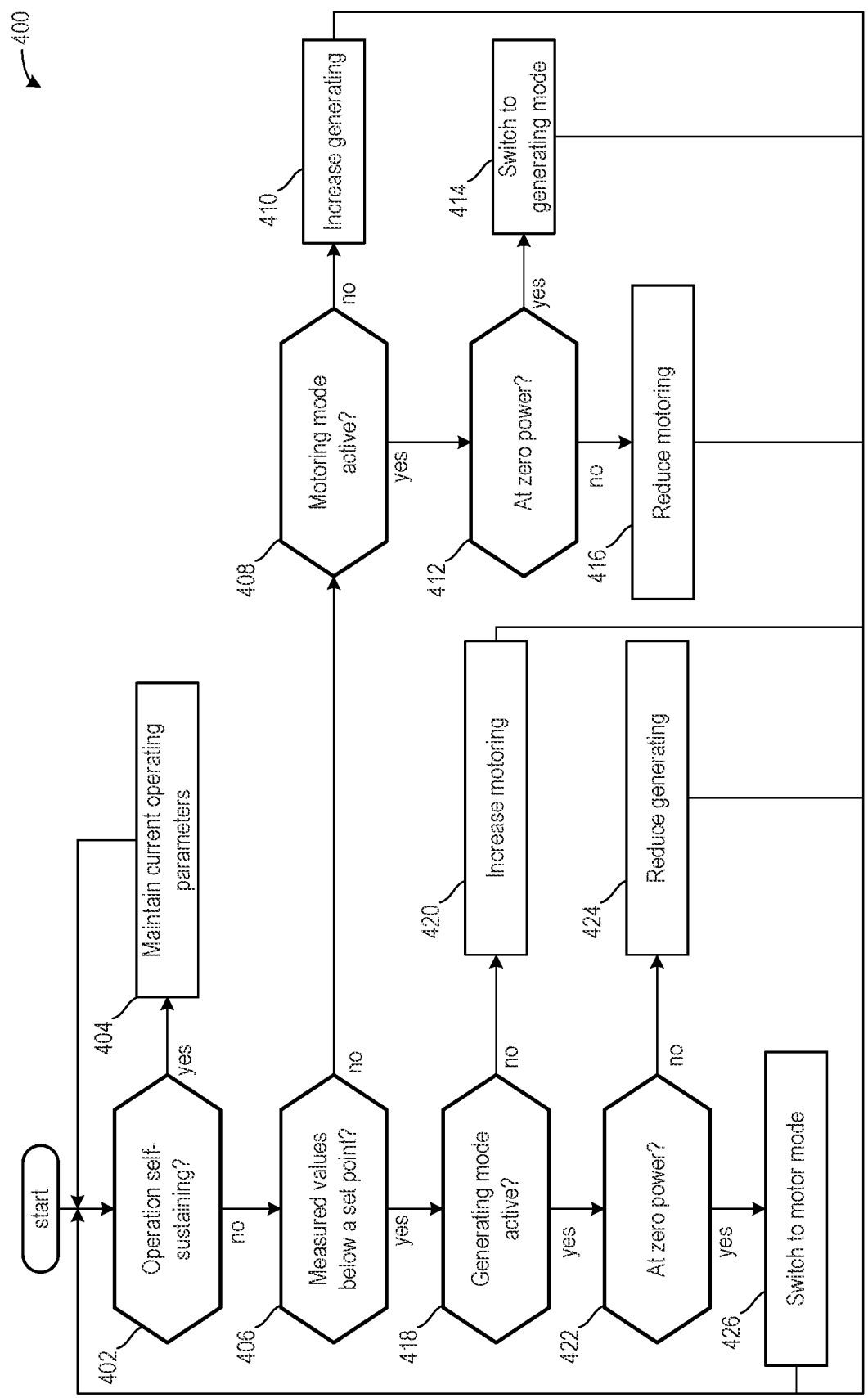
FIG. 4 shows a high-level method for set-point control of the air Brayton cycle via operation of the e-turbo of FIG. 1.
Figure 5:
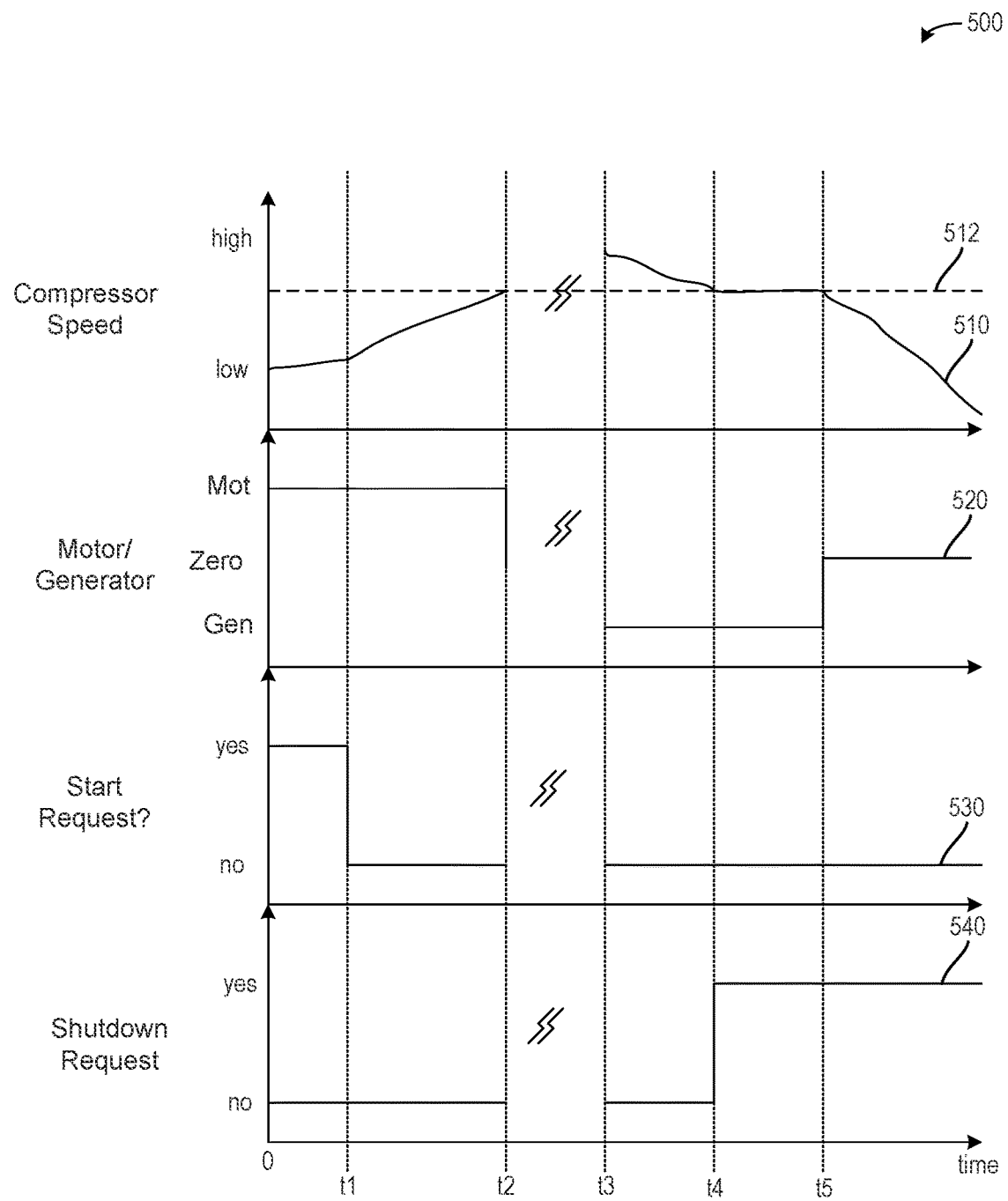
FIG. 5 shows an operating sequence graphically illustrating changes to e-turbo conditions based on an operating point of the air Brayton cycle.

The description and embodiments of the subject matter disclosed herein relate to methods and systems for operating a system utilizing an electric turbocharger (referred to herein as an e-turbo) to adjust an operating point of the air Brayton cycle. The e-turbo may be useful in the air Brayton cycle, as shown in FIG. 1. The e-turbo operation may be adjusted in response to various operating points of the air Brayton cycle. For example, in the presence of a start request, a motor/generator of the e-turbo may drive a shaft thereof to increase the output of the compressor and reduce the time needed to reach a self-sustaining operation, as shown in FIG. 2. As another example, in the presence of a shutdown request, the motor/generator may draw power from the shaft and slow the compressor and the turbine, thereby reducing the time needed for the air Brayton cycle to exit self-sustaining operation, as shown in FIG. 3. Additionally, the e-turbo may be operated to control one or more operating points of the air Brayton cycle to increase an efficiency thereof, as shown in FIG. 4. FIG. 5 graphically illustrates an operating sequence showing changes to e-turbo operation in response to air Brayton cycle operating points.

Referring to FIG. 1, a block diagram of an embodiment of a system 100 is shown. The system may use an air Brayton cycle in one example. The air Brayton cycle may be used in the operation of an engine system. A suitable engine system may be that of a locomotive, in one example. Additionally or alternatively, the air Brayton cycle may be useful in a standalone source of power (such as a stationary power generator). The air Brayton cycle may control a pump, a mechanical motor, or other device. In some examples, additionally or alternatively, the air Brayton cycle may be useful an engine.

The Brayton cycle system may include a housing defining a chamber 105. A first energy source 106 may be provided to the chamber. The first energy source may be a non-controllable first energy source, such as waste heat taken from another process and absorbed via a heat exchanger.

The first energy source may couple to a stage of a turbocharger. In one example, the stage is an e-turbo 120. In some examples, additionally or alternatively, the turbocharger may include multiple stages, wherein the other stages that are not electrically powered and the stage is only electrically powered stage of the turbocharger. Additionally or alternatively, in other embodiments, the turbocharger may include multiple e-turbo stages. The chamber of the first energy source may be coupled to the e-turbo and receive the second energy element therefrom, such as air.

A compressor 130 of the e-turbo may provide a compressed air output 185 that flows through downstream compressor stages 115 and to the chamber of the first energy source. The first energy source may generate a heated charge output 190 that flows through upstream turbine stages 110 prior to flowing to and expanding within a turbine 135 of the e-turbo. In one example, the downstream compressor stages may receive air from each stage of the turbocharger included in the Brayton cycle system. The upstream turbine stages may flow the heated charge output to each stage of the turbocharger included in the Brayton cycle system. Thus, the downstream compressor stage and the upstream turbine stage may include a plurality of ports and fittings coupled to conduits extending to the different stages of the turbocharger, wherein the downstream compressor stage is coupled to only compressors of the turbocharger and the upstream turbine stage is coupled to only turbines of the turbocharger.

The compressor and other compressors of the stages of the turbocharger may receive air input 175 from upstream compressor stages 150. The upstream compressor stages may include multiple ports and conduits extending from it to each compressor of the turbocharger. Additionally or alternatively, the upstream compressor stages may include a single port for receiving air. The turbine and other turbines of the stages of the turbocharger may exhaust gases 180 to downstream turbine stages 155. The downstream turbine stages may include multiple ports and conduits for receiving gases from the turbines and a single port and conduit for exhausting the gas to an ambient atmosphere or to an aftertreatment system.

The turbocharger may drive the second fluid toward the first energy source to enable operation of the Brayton cycle system. During start-up and shutdown of the Brayton cycle system, assistance may be used to speed up or slow down a shaft 140 mechanically coupling the compressor and the turbine. A motor/generator 125 may be coupled to the shaft and arranged between the turbine and the compressor. The motor/generator may only be included in the e-turbo. In one example, the motor/generator is not included in other stages of the turbocharger. A mechanical load 145 may be coupled to and driven by the shaft. In one example, the mechanical load is coupled to a first extreme end of the shaft and the turbine is coupled to a second extreme end of the shaft, opposite the first extreme end. The motor/generator and the compressor may be arranged on sections of the shaft between the turbine and the mechanical load.

In a first mode (e.g., a motoring mode), the motor/generator may increase a rotational speed of the shaft. In a second mode (e.g., a generating mode), the motor/generator may reduce the rotational speed of the shaft. In a third mode (e.g., a zero power operation), the motor/generator may not adjust the rotational speed of the shaft. The motor/generator may be coupled to an e-turbo control 160, which may direct electrical energy 195 to flow to the motor/generator from an energy storage device 165 when in the motoring mode. In one example, the motor/generator may provide a third energy source driving the shaft, wherein the first and second energy sources are fluid energy sources and the third energy source is mechanical and driven by electrical power.

In the generating mode, as the motor/generator slows the shaft, electrical energy is generated and the e-turbo control may direct the electrical energy to the energy storage device (e.g., a battery, capacitor bank, or electro-chemical converter). Additionally or alternatively, the e-turbo control may direct electrical energy 172 to an auxiliary device 174 during the generating mode. The auxiliary device may include a pump, a fan, or other device. In some examples, additionally or alternatively, the energy storage device used to power the motoring mode may be different than the energy storage device receiving the electrical energy during the generating mode.

The system may operate according to an air Brayton cycle, whereby a turbocharger, which may be identical to the e-turbo of FIG. 1, may be driven by only the first and second working fluids in a self-sustaining mode. Prior to reaching the self-sustaining mode, the e-turbo may provide a third energy source and drive the shaft to assist the Brayton cycle system and reduce a time needed to reach the self-sustaining mode.

The system may further include control system 114. Control system is shown receiving information from a plurality of sensors 116 (various examples of which are described herein) and sending control signals to a plurality of actuators 181 (various examples of which are described herein). As one example, sensors may include a speed and torque sensors of the motor/generator, for measuring a speed and a direction of rotation of the motor/generator, and a torque of the motor/generator, respectively. Other sensors such as additional pressure, temperature, air/fuel ratio, and composition sensors may be coupled to various locations in the system.

A controller 112 may be programmed and/or configured as a conventional microcomputer including a microprocessor unit, input/output ports, read-only memory, random access memory, keep alive memory, a controller area network (CAN) bus, etc. The controller may be shifted between sleep and wake-up modes for additional energy efficiency. The controller may receive input data from the various sensors, process the input data, and trigger the actuators in response to the processed input data based on instruction or code programmed therein corresponding to one or more routines. Example control routines are described herein with regard to FIGS. 2-4. The controller may switch the various systems and components selectively between operating modes.

Turning now to FIG. 2, it shows a high level flow chart illustrating a method 200 for adjusting operation of an e-turbo in response to a start request for an air Brayton cycle. Instructions for carrying out method and the other methods included herein may be executed by a controller based on computer-readable instructions stored on a memory of the controller and in conjunction with signals received from sensors of the engine system, such as the sensors described above with reference to FIG. 1. The controller may employ engine actuators of the engine system to adjust engine operation, control cycles and performance, and/or switch between modes, according to the methods described below. In one example, the modes may include a first mode where the system is operated without the Brayton cycle and a second mode where the system is operated with the Brayton cycle.

At step 201, the method may include determining if a start request is present. The start request may be present if an ignition key is turned or a start button being depressed. Additionally or alternatively, the start may be requested remotely via a wireless connection. In one example, a mobile device such as a phone, key, laptop, or the like may be used to signal the start request. If the start request is not present, then at step 202, the method include continuing to monitor operating parameters. Additionally or alternatively, the motor/generator may not be adjusted to the motoring mode to assist starting the Brayton cycle system.

If the start request is present, then at step 203, method includes determining if the motor/generator is in the motoring mode. In one example, the controller may determine the motor/generator is in the motoring mode via feedback from a motor/generator speed sensor indicating the direction of rotation of the motor/generator is positive. In another example, the controller may determine if the motor/generator is in the motoring mode based on a condition of the e-turbo control. For example, if the e-turbo control is diverting electrical power to the motor/generator, then the motoring mode may be active. Additionally or alternatively, if a state of charge (SOC) of the energy storage device is being consumed, then the motoring mode may be active. If the SOC of the energy storage device is increasing or if the direction of rotation of the motor/generator is negative, then the generating mode may be active. If a speed of rotation of the motor/generator is zero, then a zero power mode may be active. If it is determined that the motor/generator is not in the motoring mode, then at step 206, method may include switching to the motoring mode. Switching to the motoring mode may include where the motor/generator receives electrical energy and mechanically drives the shaft, thereby providing a third energy source to the Brayton cycle system.

If the motoring mode is active, then at step 209, the method includes motoring the e-turbo via the motor/generator. Motoring of the e-turbo via the motor/generator may reduce a duration of time from starting the Brayton cycle system to reaching a self-sustaining operation. A magnitude of the motoring may be a fixed amount, in one example. In some embodiments, the magnitude of the motoring may be a dynamic amount based on one or more of the SOC of the energy storage device, e-turbo speed, a power output, and a mechanical load power demand. For example, if the SOC is less than a threshold SOC, then the magnitude of the motoring may be reduced, whereas if the SOC is greater than or equal to the threshold SOC, then the magnitude of the motoring may be increased. As another example, the magnitude of motoring may be higher during an earlier stage of the start and lower during a later stage of the start as the e-turbo speed increases. As a further example, the magnitude of the motoring may be increased in response to the power output of the Brayton cycle system being below a determined power output. The determined power output may be proportional to the mechanical load power demand. If the power output is less than the determined power output, then the mechanical load power demand may not be met. In response to the mechanical load power demand not being met, the magnitude of the motoring may be increased.

At step 212, method includes determining if the air Brayton cycle is self-sustaining. The cycle may be self-sustaining if one or more operating points of the Brayton cycle system are being met (e.g., power output, pressure, flow rate, energy extraction, mechanical load demand, etc.). In one example, the self-sustaining mode may include where the e-turbo operates in the air Brayton cycle and meet the mechanical load power demand without operating the motor/generator in the motoring mode. In another example, the self-sustaining mode may include where the e-turbo operates in the air Brayton cycle with assistance from the motor/generator operating in the motoring mode being less than a determined amount. The determined amount may be based on a SOC consumption In one example, the operation of the e-turbo may be self-sustaining if the power output of the air Brayton cycle is above a threshold level of power, such that discontinuing the motoring mode of the motor/generator of the e-turbo may still allow the air Brayton cycle to produce the desired fixed set point level of the desired parameter, as determined by e.g., measurements of power generated by the e-turbo shaft measured at the motor/generator, and/or measurements of the power transmitted to the mechanical load via a power sensor included thereat. If it is determined that the air Brayton cycle is not self-sustaining, then method may return to step 209 to continue operating the motoring mode.

If it was determined that the air Brayton cycle is self-sustaining, then at step 215, method includes switching to a set point control mode. In one example, the motor/generator may be switched to the generating mode or the zero power mode.

Turning now to FIG. 3, it shows a high level flow chart illustrating a method 300 for adjusting operation of the e-turbo in the air Brayton cycle in response to a shutdown request being present.

The method begins at step 302, which includes determining if a shutdown is requested. The shutdown may be requested in response to an ignition key being turned or a start button being depressed. Additionally or alternatively, the shutdown may be requested remotely via a wireless connection. In one example, a mobile device such as a phone, key, laptop, or the like may be used to signal the shutdown request. If the shutdown request is not present, then at step 304, the method includes maintaining current operating parameters. In one example, a shutdown operation is not initiated.

At step 306, method includes determining if the motor/generator is in the generating mode. In one example, the controller may determine the motor/generator is in the generating mode via feedback from a motor/generator speed sensor indicating the direction of rotation of the motor/generator is negative. In another example, the controller may determine if the motor/generator is in the generating mode based on a condition of the e-turbo control. For example, if the e-turbo control is receiving electrical power from the motor/generator, then the generating mode may be active. Additionally or alternatively, if a state of charge (SOC) of the energy storage device is being replenished, then the generating mode may be active. If the SOC of the energy storage device is decreasing or if the direction of rotation of the motor/generator is positive, then the motoring mode may be active. If a speed of rotation of the motor/generator is zero, then a zero power mode may be active. If it is determined that the motor/generator is not in a generating mode, then at step 308, method may include switching to the generating mode. Switching to the generating mode may include where the motor/generator generates electrical energy by slowing the shaft, wherein the generated electrical energy is sent to the energy storage device or the auxiliary device via the e-turbo control.

If it is determined that the motor/generator is in the generating mode or has been switched to the generating mode, then at step 310, the method includes generating electrical energy by decreasing a rotational speed of the shaft. The generating mode may slow the shaft at a fixed rate based a tolerance of the motor/generator, the e-turbo control, and the energy storage device. Additionally or alternatively, the generator mode may slow the shaft at different rates based on one or more conditions including a current shaft speed, the SOC, and an auxiliary device power demand. For example, the shaft speed may be reduced at a higher rate if the shaft speed is relatively high when the shutdown request is present. Additionally or alternatively, if the SOC of the energy storage device is relatively low when the shutdown request is present, then the shaft speed may be reduced at a higher rate. In some embodiments, additionally or alternatively, if the auxiliary device power demand is relatively high, then the shaft speed may be reduced at a higher rate.

At step 312, the method includes determining if the air Brayton cycle is self-sustaining. If it is determined that the air Brayton cycle is not self-sustaining, then at step 314, method may proceed to shutdown, whereby the Brayton cycle system may gradually reduce its power output to zero without input from the motor/generator.

Turning now to FIG. 4, it shows a high level flow chart illustrating a method 400 for adjusting operation of the e-turbo to adjust conditions of the air Brayton cycle to a determined operating point value.

The method begins at step 402, which includes determining if operation in the air Brayton cycle is self-sustaining. In one example, the operation in the air Brayton cycle is self-sustaining if one or more operating points are equal to determined values. The operating point may correspond to an operating condition, such as turbine speed, compressor speed, mass flow, turbine temperature, compressor temperature, and a mechanical power output. The operating point may be measured via a corresponding sensor coupled to the controller. Additionally or alternatively, one or more operating points may be estimated based on values of other operating points via the controller. For example, the compressor speed may be estimated based on a turbine speed. Additionally or alternatively, the mechanical power output may be estimated based on a shaft speed. The controller may command the e-turbo control to switch modes of the motor/generator or to adjust a magnitude of its operation within a mode to control the operation in the air Brayton cycle to determined values. In one example, if the operating point is the mechanical load output, then operation may be self-sustaining if the mechanical load output is equal to a mechanical load output demand. If operation is self-sustaining, then the method may proceed to step 404, which includes maintaining current operating parameters.

If it is determined that operation in the air Brayton cycle is not self-sustaining, then at step 406, method includes determining one or more operating conditions is below a determined value. For example, if the mechanical load output is less than the mechanical load output demand, or if a compressor speed is less than a determined compressor speed, then operating conditions are below corresponding determined values.

If operating conditions are not below determined values, then it may be inferred that operation in the air Brayton cycle includes where operating conditions are above determined values, and at step 408, method includes determining if the e-turbo is operating in the motoring mode. If the e-turbo is not operating in the motoring mode, then at step 410, the method may include increasing generating of the e-turbo. In one example, by increasing a magnitude of the generating of the e-turbo, wherein the motor/generator was already in the generating mode, to generate more electrical power by further decreasing the shaft speed. For example, increasing generating may further decrease the shaft speed, which may decrease the compressor speed, the turbine speed, and other operating points in the air Brayton cycle closer to self-sustaining values. The method may return to determine if operation is now self-sustaining.

If it is determined that the e-turbo is operating in the motoring mode, then at step 412, the method includes determining if the e-turbo is operating at zero power production. Determining if the motor/generator is operating at zero power may include determining one or more of measurements of power generated by the e-turbo shaft measured at the motor/generator and measurements of the power transmitted to the mechanical load via a power sensor. The zero power may include where the motor/generator does not act upon the shaft. In this way, the shaft may rotate without input from the motor/generator.

If it is determined that the e-turbo is operating at zero power production, then at step 414, method includes switching to the generating mode. By doing this, operating points in the air Brayton cycle may decrease closer to self-sustaining operation values.

If it is determined that the e-turbo is not operating at zero power production, then at step 416, method includes reducing motoring of the e-turbo. Reducing motoring of the e-turbo may be achieved by sending less electrical power to the motor/generator, which may result in the motor/generator assisting rotation of the shaft less. The method may then monitor if self-sustaining operation is achieved.

Returning to step 406, if it is determined that operating conditions in the air Brayton cycle are below one or more determined values, then at step 418, the method includes determining if the motor/generator is operating in the generating mode. If it is determined that the e-turbo is not operating in the generating mode, then at step 420, the method includes increasing motoring of the e-turbo. Increasing motoring of the e-turbo may increase one or more operating point values closer to determined values corresponding to the self-sustaining mode. For example, by increasing the motoring, the turbine and compressor speeds may increase, which may increase the mechanical load output.

If it is determined that the e-turbo is operating in the generating mode, then at step 422, the method may include determining if the e-turbo is operating at zero power production. If it is determined that the e-turbo is generating electrical power being sent to the energy storage device, then at step 424, the method includes reducing a magnitude of generating. Reducing the magnitude of generating may increase operating point values closer to determined values associated with the self-sustaining operation. The method returns to determine if operation is self-sustaining.

If it is determined that the e-turbo is operating at zero power, then at step 426, method includes switching to the motoring mode of the e-turbo. Switching to the motoring mode may allow the e-turbo to increase the measured set point values toward determined values associated with the self-sustaining values. The method may continue to monitor parameters and adjust operation of the motor/generator based on variances between the operating values and the determined values associated with self-sustaining operation.

Turning now to FIG. 5, it shows an operating sequence illustrating changes to the e-turbo to adjust an operating point in the air Brayton cycle. Plot 510 illustrates a compressor speed and dashed line 512 illustrates a determined compressor speed. Plot 520 illustrates an e-turbo mode. Plot 530 illustrates if a start request is present. Plot 540 illustrates if a shut-down request is present. Time increases from a left to right side of the figure. The adjustments described herein may apply to other conditions in the air Brayton cycle exceeding corresponding determined values such as turbine speed, turbine temperature, compressor speed, battery SOC, and mechanical load demand.

Prior to t1, a start request is present and the compressor speed increases. The e-turbo is motored by the motor/generator in the motoring mode. At t1, the motor/generator motors the shaft and provides a third energy source to increase the compressor speed. The compressor speed is still below the determined compressor speed. At t2, the compressor speed is equal to the determined compressor speed and the motor/generator is switched to zero power output. Time elapses between t2 to t3.

At t3, the compressor speed is greater than the determined compressor speed. The motor/generator is operated to in a generating mode to slow the shaft and decrease the compressor speed. Between t3 and t4, the compressor speed decreases while the generating mode is active. At t4, the compressor speed is equal to the determined compressor speed. A shutdown request is present.

Between t4 and t5, the compressor speed is equal to the determined compressor speed and the air Brayton cycle is self-sustaining. As such, during the shutdown operation, the motor/generator may be operated in the generating mode and slow the shaft of the e-turbo. Electrical power generated therefrom At t5, the compressor speed decreases and is below the determined compressor speed. As such, the air Brayton cycle is no longer self-sustaining. The motor/generator is switched to zero power. After t5, the shutdown operation continues and the compressor speed decreases.

In some examples, additionally or alternatively, the air Brayton cycle may include an electric blower and a variable geometry turbine (VGT). In such an example, the electric blower may assist during start-up and the variable geometry turbine operation may be controlled to adjust operating conditions in the air Brayton cycle to meet determined operating conditions associated with self-sufficient operation. For example, the variable geometry turbine may have vanes that adjust a cross-sectional flow through area of the turbine, which may adjust the compressor speed. Alternatively, a fluidic variable turbine may be used in place of the VGT.

In this way, by utilizing an e-turbo as part of a Brayton cycle system, a simplified and energy efficient control of the air Brayton cycle may be achieved. In particular, operation of the e-turbo may be adjusted to control air Brayton cycle conditions. The e-turbo may be further used to enhance start-up and shutdown operation of the Brayton cycle system. By doing this, the e-turbo may provide power to the Brayton cycle system during start-up, extract power from the Brayton cycle system during shutdown, and provide or extract power to maintain operating points at determined values.

The disclosure provides support for a system including a housing defining a chamber that is configured to receive a first energy source and a second energy source, a turbocharger fluidly coupled to the chamber, and a motor/generator coupled to a shaft of the turbocharger between a compressor and a turbine. A first example of the system further includes where the motor/generator provides a third energy to the shaft. A second example of the system, optionally including the first example, further includes where the first energy source is uncontrollable and the second energy source is controllable. A third example of the system, optionally including one or more of the previous examples, further includes where the first energy source is heat and the second energy source is air. A fourth example of the system, optionally including one or more of the previous examples, further includes where the motor/generator is electrically coupled to one or more of an energy storage device and an auxiliary device. A fifth example of the system, optionally including one or more of the previous examples, further includes a controller, with the shaft being physically coupled to a mechanical load, and the controller is configured to selectively operate the turbocharger in a first mode that is not a Brayton cycle and a second mode that is a Brayton cycle.

The disclosure provides further support for a method, comprising adjusting operation of a motor/generator coupled to a shaft of a turbocharger in response to a condition, wherein the shaft is further coupled to a turbine, a compressor, and a mechanical load. A first example of the method further includes where adjusting operation of the motor/generator comprises motoring the shaft, and wherein the condition is a start request being present. A second example of the method, optionally including the first example, further includes where adjusting operation of the motor/generator comprises generating off the shaft, and wherein the condition is a shutdown request being present. A third example of the method, optionally including one or more of the previous examples, further includes where the condition is an operating value being different than a determined operating value associated with a self-sustaining operation of a Brayton cycle that that comprises the turbocharger. A fourth example of the method, optionally including one or more of the previous examples, further includes where adjusting operation of the motor/generator comprises motoring the shaft in response to the operating value being less than a determined operating value. A fifth example of the method, optionally including one or more of the previous examples, further includes where adjusting operation of the motor/generator comprises generating off the shaft. A sixth example of the method, optionally including one or more of the previous examples, further includes where operation of the motor/generator further comprises adjusting operation to a zero power operation in response to a self-sustaining operation of an air Brayton cycle comprising the turbocharger. A seventh example of the method, optionally including one or more of the previous examples, further includes where the motor/generator is coupled to an energy storage device and an auxiliary device. An eighth example of the method, optionally including one or more of the previous examples, further includes where the condition is a power output of the shaft.

The disclosure provides additional support for a system including a housing defining a chamber that is configured to receive a first energy source and a second energy source, a turbocharger coupled to the chamber, a motor/generator coupled to a shaft of the turbocharger between a compressor and a turbine, a mechanical load coupled to the shaft, and a controller with computer-readable instructions stored on memory thereof that when executed cause the controller to monitor a condition of the system, and adjust operation of the motor/generator in response to the condition. A first example of the system further includes where the condition is one or more of a turbine speed, a compressor speed, a turbine temperature, a compressor temperature, a shaft speed, and a mechanical load output. A second example of the system, optionally including the first example, further includes where the controller is configured to cause the motor/generator to motor the shaft in response to the condition of a start request being present, and wherein the controller is configured to cause the motor/generator to regenerate off the shaft in response to the condition of a shutdown request being present. A third example of the system, optionally including one or more of the previous examples, further includes where the controller is configured to adjust operation of the motor/generator to zero power when the system is at a self-sustaining operation, and the condition comprises operating points of the system being equal to determined operating point values associated with the self-sustaining operation. A fourth example of the system, optionally including one or more of the previous examples, further includes where the motor/generator is electrically coupled to an energy storage device and an auxiliary device and the controller is configured to selectively operate the system in a Brayton cycle.

In one embodiment, the control system, or controller, may have a local data collection system deployed and may use machine learning to enable derivation-based learning outcomes. The controller may learn from and make decisions on a set of data (including data provided by the various sensors), by making data-driven predictions and adapting according to the set of data. In embodiments, machine learning may involve performing a plurality of machine learning tasks by machine learning systems, such as supervised learning, unsupervised learning, and reinforcement learning. Supervised learning may include presenting a set of example inputs and desired outputs to the machine learning systems. Unsupervised learning may include the learning algorithm structuring its input by methods such as pattern detection and/or feature learning. Reinforcement learning may include the machine learning systems performing in a dynamic environment and then providing feedback about correct and incorrect decisions. In examples, machine learning may include a plurality of other tasks based on an output of the machine learning system. The tasks may be machine learning problems such as classification, regression, clustering, density estimation, dimensionality reduction, anomaly detection, and the like. In examples, machine learning may include a plurality of mathematical and statistical techniques. The machine learning algorithms may include decision tree based learning, association rule learning, deep learning, artificial neural networks, genetic learning algorithms, inductive logic programming, support vector machines (SVMs), Bayesian network, reinforcement learning, representation learning, rule-based machine learning, sparse dictionary learning, similarity and metric learning, learning classifier systems (LCS), logistic regression, random forest, K-Means, gradient boost, K-nearest neighbors (KNN), a priori algorithms, and the like. In embodiments, certain machine learning algorithms may be used (e.g., for solving both constrained and unconstrained optimization problems that may be based on natural selection). In an example, the algorithm may be used to address problems of mixed integer programming, where some components are restricted to being integer-valued. Algorithms and machine learning techniques and systems may be used in computational intelligence systems, computer vision, Natural Language Processing (NLP), recommender systems, reinforcement learning, building graphical models, and the like. In an example, machine learning may be used for vehicle performance and control, behavior analytics, and the like.

In one embodiment, the controller may include a policy engine that may apply one or more policies. These policies may be based at least in part on characteristics of a given item of equipment or environment. With respect to control policies, a neural network can receive input of a number of environmental and task-related parameters. The neural network can be trained to generate an output based on these inputs, with the output representing an action or sequence of actions that the engine system should take. This may be useful for balancing competing constraints on the engine. During operation of one embodiment, a determination can occur by processing the inputs through the parameters of the neural network to generate a value at the output node designating that action as the desired action. This action may translate into a signal that causes the engine to operate. This may be accomplished via back-propagation, feed forward processes, closed loop feedback, or open loop feedback. Alternatively, rather than using backpropagation, the machine learning system of the controller may use evolution strategies techniques to tune various parameters of the artificial neural network. The controller may use neural network architectures with functions that may not always be solvable using backpropagation, for example functions that are non-convex. In one embodiment, the neural network has a set of parameters representing weights of its node connections. A number of copies of this network are generated and then different adjustments to the parameters are made, and simulations are done. Once the output from the various models are obtained, they may be evaluated on their performance using a determined success metric. The best model is selected, and the vehicle controller executes that plan to achieve the desired input data to mirror the predicted best outcome scenario. Additionally, the success metric may be a combination of the optimized outcomes. These may be weighed relative to each other.

As used herein, an element or step recited in the singular and preceded with the word "a" or "an" should be understood as not excluding plural of said elements or steps, unless such exclusion is explicitly stated. Furthermore, references to "one embodiment" of the invention do not exclude the existence of additional embodiments that also incorporate the recited features. Moreover, unless explicitly stated to the contrary, embodiments "that includes," "including," or "having" an element or a plurality of elements having a particular property may include additional such elements not having that property. The terms "including" and "in which" are used as the plain-language equivalents of the respective terms "that includes" and "wherein." Moreover, the terms "first," "second," and "third," etc. are used merely as labels, and are not intended to impose numerical requirements or a particular positional order on their objects.

The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. A system, comprising:
a housing defining a chamber that is configured to receive a first energy source and a second energy source;
a turbocharger fluidly coupled to the chamber; and
a motor/generator coupled to a shaft of the turbocharger between a compressor and a turbine; and
a controller with computer-readable instructions stored on memory thereof that when executed cause the controller to:
monitor a condition of the system; and
adjust operation of the motor/generator in response to the condition,
wherein the controller is configured to cause the motor/generator to motor the shaft in response to the condition of a start request being present, and wherein the controller is configured to cause the motor/generator to regenerate off the shaft in response to the condition of a shutdown request being present, and
wherein the controller is configured to adjust operation of the motor/generator to zero power when the system is at a self-sustaining operation, and the condition comprises operating points of the system being equal to determined operating point values associated with the self-sustaining operation.

2. The system of claim 1, wherein the motor/generator provides a third energy to the shaft.

3. The system of claim 1, wherein the first energy source is uncontrollable and the second energy source is controllable.

4. The system of claim 1, wherein the first energy source is heat and the second energy source is air.

5. The system of claim 1, wherein the motor/generator is electrically coupled to one or more of an energy storage device and an auxiliary device.

6. The system of claim 1, further comprising the shaft being physically coupled to a mechanical load, and the controller is configured to selectively operate the turbocharger in a first mode that is not a Brayton cycle and a second mode that is a Brayton cycle.

7. A method, comprising:
adjusting operation of a motor/generator coupled to a shaft of a turbocharger in response to a condition, wherein the shaft is further coupled to a turbine, a compressor, and a mechanical load,
wherein the condition is a start request being present, and wherein adjusting operation of the motor/generator comprises motoring the shaft responsive to the start request being present,
wherein the condition is a shutdown request being present, and wherein adjusting operation of the motor/generator comprises generating off the shaft responsive to determining the shutdown request being present, and
wherein adjusting operation of the motor/generator further comprises adjusting operation to a zero power operation in response to a self-sustaining operation of an air Brayton cycle comprising the turbocharger.

8. The method of claim 7, wherein the condition is an operating value being different than a determined operating value associated with the self-sustaining operation of the Brayton cycle that comprises the turbocharger.

9. The method of claim 8, wherein adjusting operation of the motor/generator comprises motoring the shaft in response to the operating value being less than the determined operating value.

10. The method of claim 7, wherein the motor/generator is coupled to an energy storage device and an auxiliary device.

11. A system, comprising:
a housing defining a chamber that is configured to receive a first energy source and a second energy source;
a turbocharger coupled to the chamber;
a motor/generator coupled to a shaft of the turbocharger between a compressor and a turbine;
a mechanical load coupled to the shaft; and
a controller with computer-readable instructions stored on memory thereof that when executed cause the controller to:
monitor a condition of the system; and
adjust operation of the motor/generator in response to the condition,
wherein the controller is configured to cause the motor/generator to motor the shaft in response to the condition of a start request being present, and wherein the controller is configured to cause the motor/generator to regenerate off the shaft in response to the condition of a shutdown request being present, and
wherein the controller is configured to adjust operation of the motor/generator to zero power when the system is at a self-sustaining operation, and the condition comprises operating points of the system being equal to determined operating point values associated with the self-sustaining operation.

12. The system of claim 11, wherein the condition is one or more of a turbine speed, a compressor speed, a turbine temperature, a compressor temperature, a shaft speed, and a mechanical load output.

13. The system of claim 11, wherein the motor/generator is electrically coupled to an energy storage device and an auxiliary device and the controller is configured to selectively operate the system in a Brayton cycle.

* * * * *